United States Patent [19]

Grube

[11] 4,281,699

[45] Aug. 4, 1981

[54] LOCKING FASTENER WITH RESILIENT AND RIGID FLANGE SEGMENTS

[75] Inventor: William L. Grube, Lake Bluff, Ill.

[73] Assignee: MacLean-Fogg Company, Mundelein, Ill.

[21] Appl. No.: 31,759

[22] Filed: Apr. 20, 1979

[51] Int. Cl.³ .......................................... F16B 39/282
[52] U.S. Cl. ................................................. 411/176
[58] Field of Search ...................... 151/37, 35, 38, 33; 85/50 R, 62, 32 R, 9 R, 32 V

[56] References Cited

U.S. PATENT DOCUMENTS

| | | | |
|---|---|---|---|
| 367,196 | 7/1887 | Deblieux | 151/37 |
| 551,043 | 12/1895 | Otto | 151/38 |
| 684,673 | 10/1901 | Clark | 151/35 |
| 1,049,590 | 1/1913 | Mosher | 151/37 |
| 1,229,911 | 6/1917 | Dodds | 151/38 |
| 1,581,559 | 4/1926 | Williams | 151/38 |
| 1,635,082 | 7/1927 | Hultgren et al. | 151/38 |
| 1,923,647 | 8/1933 | Vera | 151/37 |
| 2,253,241 | 8/1941 | MacDonald | 151/37 |
| 2,794,476 | 6/1957 | Hanneman | 151/35 |
| 2,959,204 | 11/1960 | Rigot | 151/37 |
| 3,056,443 | 10/1962 | Knocke | 151/38 |
| 3,078,899 | 2/1963 | MacLean et al. | 151/37 |
| 3,079,830 | 3/1963 | Faroni et al. | 85/32 R |
| 3,164,055 | 1/1965 | Duffy | 151/38 X |
| 3,543,826 | 12/1970 | Fergaard | 151/21 B |
| 3,877,339 | 4/1975 | Muenchinger | 151/35 X |
| 4,094,352 | 6/1978 | Hlinsky | 151/37 |

FOREIGN PATENT DOCUMENTS

| | | | |
|---|---|---|---|
| 276786 | 9/1927 | United Kingdom | 151/38 |
| 454112 | 9/1936 | United Kingdom | 151/37 |
| 1234131 | 6/1971 | United Kingdom | 151/37 |

Primary Examiner—Ramon S. Britts
Attorney, Agent, or Firm—Mason, Kilehmainen, Rathburn & Wyss

[57] ABSTRACT

A locking fastener such as a threaded nut, bolt or screw includes a body portion with a flange at the workpiece engaging end defining a bearing surface. Segments of the flange are rendered rigid by brace structure associated with the body portion of the fastener. Locking teeth project from the bearing surface in resilient segments of the flange located between the rigid segments. Upon tightening of the fastener against a workpiece, substantial clamp loads are imposed by the rigid flange segments while engagement of the teeth with the workpiece causes axial deflection of the resilient segments so that loss of clamp load and decrease in release torque due to tooth embedment is prevented.

4 Claims, 7 Drawing Figures

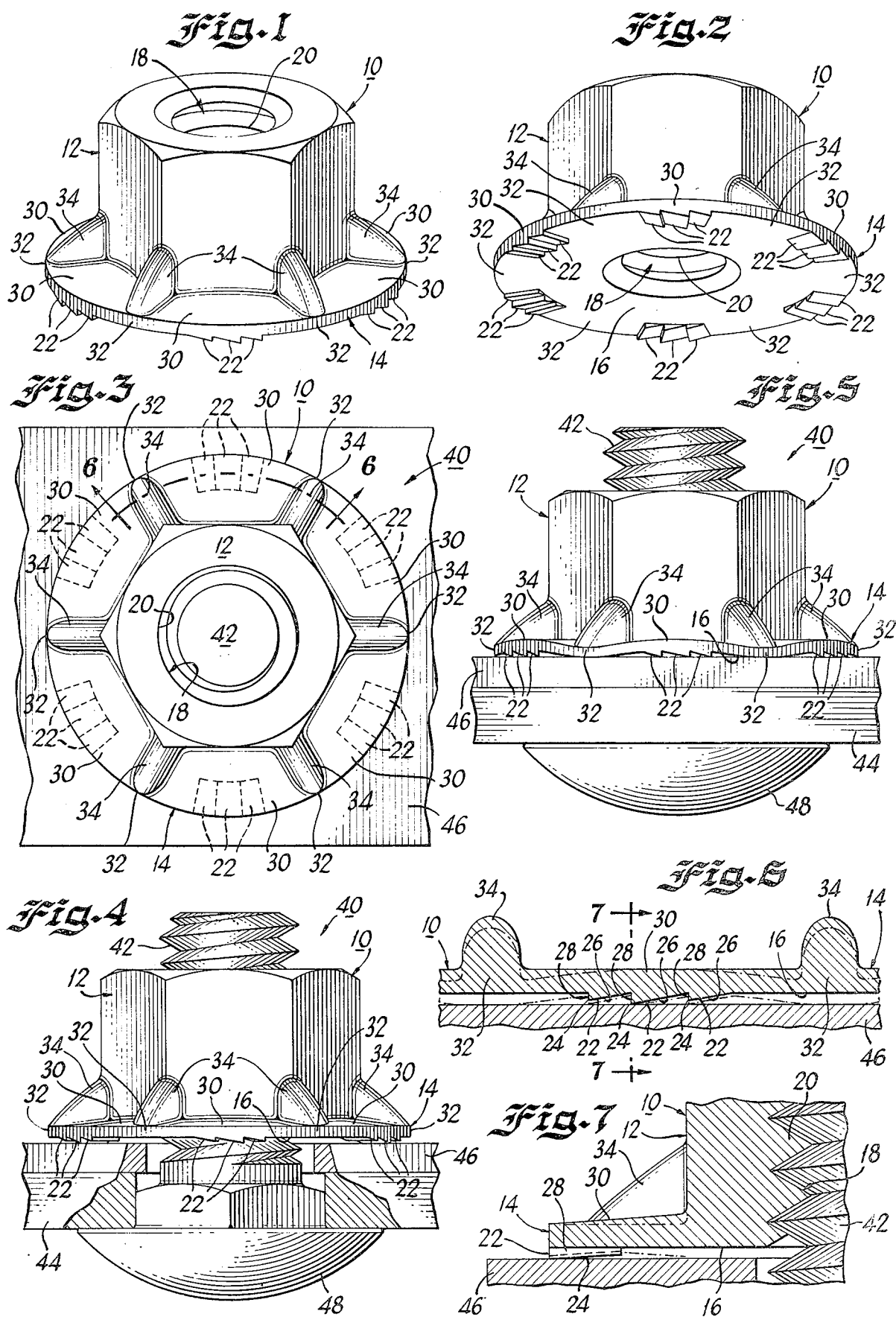

LOCKING FASTENER WITH RESILIENT AND RIGID FLANGE SEGMENTS

The present invention relates to an improved locking fastener of the type having locking teeth engageable with a workpiece for increasing the torque required for release of the fastener.

In some respects the disclosure of the present application is similar to the disclosure of a U.S. patent application entitled FASTENER WITH FLEXIBLE FLANGE, Ser. No. 031,760 filed on the same day as the present application.

A known type of locking fastener includes an array of locking teeth in the bearing surface of the fastener body. The bearing surface may be defined on a flange formed on the body or head of a fastener such as a nut, bolt or screw. Upon tightening of a threaded joint, the teeth engage a workpiece, i.e., the surface of a structural member or the like in the joint, to provide a locking function. Examples of known fasteners of this character are shown in U.S. Pat. Nos. 3,078,899—MacLean III et al and 4,094,352—Hlinsky.

Locking fasteners of the type shown in the above identified patents have performed well, and in many typical installations are capable of achieving a ratio of "off torque" to "on torque" well in excess of unity. On torque, also referred to as application torque, is the torque applied to the fastener in a threaded joint to tighten the fastener. Off torque, also referred to as release torque, is the torque required to release or loosen the threaded joint.

Among the many factors which affect the off torque - on torque ratio, and thus the effectiveness of a locking fastener, are the bolt length or grip length of the joint and the hardness of the materials at the joint and particularly the hardness of the workpiece engaged by the locking teeth. With known locking fasteners such as those disclosed in the above identified patents, the off torque - on torque ratio falls if the bolt length, or thickness, of the joint is small and if a hard material is used in the joint. For example, in a joint having a bolt length in the neighborhood of one to two bolt diameters in which the workpiece is a hard material, the off torque to on torque ratio can be near unity. This means that under such adverse conditions, the locking fastener performs only marginally better than a conventional fastener having no locking teeth.

The difficulties experienced with joints of short bolt length arises from the relative absence of resilience in the joint. In a longer joint of, for example, four or five bolt diameters, when the joint is tightened and the bolt is subjected to tension to apply the clamp load, the bolt elongates resiliently. To a lesser extent, resilient compression may exist in the clamped part of the joint including the workpiece. Consequently, the locking teeth are resiliently biased against the workpiece during the initial rotation of the fastener in the loosening direction. This resilient biasing effect is largely lost in a joint with a short bolt length and the desired locking effect is not obtained, particularly with a hard workpiece.

Another difficulty arises from working of the fastened joint due to vibrations or other cyclic loading. Such loading can cause progressive embedment of the locking teeth into the workpiece, with the result that the clamp load applied by the bolt is reduced. Similarly, in a static joint, tooth embedment can occur due to a phenomenon known as "creep". Extreme reduction in clamp load or bolt tension can result in loosening of the joint by rendering the locking teeth ineffective. Moreover, if the clamp load decreases below the maximum actual load experienced in the joint, the variable loads to which the fastener system is then subjected can lead to fatigue and breakage.

While flanges are widely used in locking fasteners of the type disclosed in the above identified patents, such flanges are functionally rigid and serve to increase the area of the bearing surface thereby to avoid undesirable stress concentrations in the joint. Although fasteners having resilient flanges are known, it is not possible to overcome the difficulties discussed above by use of a resilient flange on a known toothed locking fastener because of the necessity for the fastener to apply substantial clamp loads. If the flange is sufficiently resilient to permit deflection of the teeth equivalent to bolt elongation in a joint of relatively long bolt length, then the rigidity of the flange is inadequate to apply the necessary clamp loads. Conversely, if the flange is rigid enough to produce the desired clamp loads, sufficient resiliency cannot be achieved.

Among the important objects of the present invention are to provide improved locking fastener exhibiting good locking characteristics and a high off torque - on torque ratio even with joints of relatively short bolt lengths and hard materials; to provide a locking fastener simultaneously achieving resilient deflection of its locking teeth upon tightening as well as ample clamp loads; to provide a locking fastener wherein fatigue of the fastener system and/or loosening of the joint due to locking tooth embedment into the workpiece is avoided; to provide a locking fastener wherein tooth embedment does not result in loss of clamp load; and to provide an improved locking fastener overcoming problems and disadvantages experienced with such fasteners in the past.

In brief, the objects of the present invention are realized by the provision of a locking fastener for a threaded joint, the fastener including a body portion and a flange formed integrally at an end of the body portion and defining a bearing surface engageable with a workpiece. The flange extends radially outward beyond the body portion, and a plurality of locking teeth project axially from the bearing surface for locking engagement with the workpiece upon tightening of the fastener.

In accordance with the invention, the teeth are disposed in a plurality of first circumferentially spaced apart regions of the flange. Second regions of the flange, interspersed between the first regions, are rendered substantially rigid by support or brace structure associated with the fastener body and reinforcing the flange in the second regions. The first regions are resiliently deflectable in the axial direction away from the workpiece as the locking teeth engage the workpiece upon tightening of the fastener. As a result, the first, relatively rigid regions are capable of applying substantial clamp loads to the threaded joint, while the second, relatively flexible regions provide resilient loading of the teeth to produce effective and reliable locking action. Moreover, embedment of the teeth in the workpiece does not decrease the total clamp load applied by the fastener.

The present invention, together with the above and other objects and advantages thereof, may be best understood by reference to the embodiments of the invention illustrated in the accompanying drawings, wherein:

FIG. 1 is a perspective view of a locking fastener embodying the present invention;

FIG. 2 is another perspective view of the locking fastener of FIG. 1;

FIG. 3 is a top view of a threaded joint including the locking fastener;

FIG. 4 is a side view of the threaded joint of FIG. 3, partly in cross section, showing the locking fastener in a snug tight condition prior to tightening;

FIG. 5 is a side view of the threaded joint with the locking fastener in the tightened condition;

FIG. 6 is a fragmentary sectional view on an enlarged scale taken along the line 6—6 of FIG. 3 in which the snug tight condition is illustrated in full lines and the tightened condition is indicated in broken lines; and FIG. 7 is a fragmentary sectional view taken along the line 7—7 of FIG. 6.

Having reference now to the drawing, there is illustrated a locking fastener generally designated by the reference numeral 10 and constructed in accordance with the principles of the present invention. The fastener 10 is illustrated in the form of a nut, although it should be understood that the principles of the invention are applicable as well to headed fasteners such as bolts and screws.

In general, the nut 10 is in the form of a hex flange nut having an hexagonal body portion 12 adapted to be engaged by a wrench for tightening of a threaded joint including the nut 10. One end of the nut is provided with a flange structure 14 defining an axially directed bearing surface 16. A central axial opening 18 extends through the nut and is provided with a female thread structure 20 for mating with complementary threads on a cooperating fastener.

A plurality of locking teeth 22 are formed upon the bearing surface 16 to provide a locking action. Each tooth includes a crest 24 (FIG. 6) defined on one side by a sloping tooth side surface 26 defining a relatively small angle, such as approximately ten degrees or so with a plane normal to the fastener axis. The other side of each tooth is defined by an abrupt or steep surface 28 which may be parallel or nearly parallel with the fastener axis. The sloping surfaces 26 permit the fastener to be rotated in the tightening direction, and the steep or abrupt surfaces 28 resist rotation of the fastener 10 in the loosening direction.

In accordance with the present invention, the flange structure 14 is provided with first segments 30 which are resiliently and axially deflectable, and with second rigid flange segments 32 alternating with the resilient regions 30. The locking teeth 22 are disposed only in the resilient regions 30. As appears in more detail below, this arrangement permits the fastener 10 to apply substantial clamp loads to a threaded joint, provides for effective locking action even in a joint of short bolt length, and avoids loss of clamp load or loosening of the fastener due to tooth embedment.

More specifically, flexibility of flange regions 30 is effected by forming the flange structure 14 of the fastener 10 with a relatively thin cross section. For example, a standard hex flange nut of 5/16 inch nominal size has a flange cross section with a thickness at its periphery of approximately 0.04 inch and a maximum flange thickness in the neighborhood of about 0.105 inch. In contrast, the locking fastener 10 constructed in accordance with the present invention and illustrated in the drawing in a 5/16 inch size may have a peripheral flange thickness of about 0.025 inch and a maximum flange thickness in the neighborhood of about 0.035 inch. As a result of the use of a relatively thin flange, the resilient flange regions 30 are able resiliently to deflect in the axial direction under the loading experienced in a threaded joint. This is in marked contrast to a standard hex flange nut wherein the flange is effectively rigid in normal use.

In order to render the flange regions 32 functionally rigid, the fastener is provided with supporting or reinforcing structure associated with the body portion 12 and aligned with the regions 32. In the illustrated embodiment of the invention, fastener 10 is provided with a number of brace of support structure 34 in the form of gussets or strut-like braces extending radially outwardly and sloping axially from the body portion 12 of the fastener 10 to the flange structure 14. The gussets 34 serve to brace or reinforce the rigid flange regions 32 so that they are unable to axially deflect to a significant degree when subjected to clamp loads in a threaded joint. In the illustrated arrangement, there are provided six gussets 34 aligned with six rigid flange regions 32, these being aligned with the corners of the hexagonal body portion 12. This configuration has the beneficial result that the radial length of the flange in the resilient regions 30 is maximized for maximum flexibility.

As best illustrated in FIG. 3, the locking teeth 22 in accordance with the invention are disposed only in the resilient flange regions 30 and no locking teeth are provided in the rigid flange regions 32. Moreover, the locking teeth 22 are disposed adjacent the periphery of the bearing surface 16 at the radially outer portion of the flange structure 14.

Having reference now to FIGS. 3-7, there is illustrated a threaded joint generally designated as 40 including the fastener 10 of the present invention. In addition to the fastener 10, the joint 40 includes a cooperating fastener in the form of a round head square neck bolt 42 having a head 48 nonrotatably engaged with a structural member 44 to which another member or workpiece 46 is joined.

In FIGS. 3, 4, 6 and 7 the joint 40 is illustrated in a snug tight or finger tight condition prior to final tightening of the fastener 10. In FIG. 5, joint 40 is illustrated in the tightened condition achieved by rotation of the nut 10 in the tightening direction. In the tightened condition tension in the bolt between bolt head 48 and nut 10 is applied as a compressive load, termed a clamp load or preload, to the member 44 and workpiece 46.

The illustrated joint 40 represents an extremely adverse installation for a locking fastener because the bolt length of the joint—i.e., the axial distance between the head 48 of the bolt 42 and the bearing surface 16 of the fastener 10—is relatively small in that it is in the neighborhood of a single diameter of the bolt shank. Because of the short bolt length, only minimal bolt elongation can occur upon tightening of the joint 40, and the inherent flexibility of the joint is slight.

In accordance with the present invention, the structure of the fastener 10 itself provides resilient flexibility for proper locking operation of the locking teeth 22 in engagement with the workpiece 46. More specifically, as shown in FIG. 5, upon tightening of the joint 40, engagement of the teeth 22 against the workpiece 46 causes the resilient flange regions 30 axially to deflect or bow away from the workpiece 46. As a result, the axial force with which the teeth 22 engage the workpiece 46 under full preload can be controlled and is a function of the resiliency or effective spring constant of the resilient flange regions 30.

While the regions 30 are capable of resilient deflection upon engagement of the teeth 22 with the workpiece, the regions 32 are incapable of significant deflection because they are effectively rigid. Regions 32 are consequently capable of applying substantial clamp loads in the joint 40. As shown in FIG. 5 and as indicated in the broken lines in FIGS. 6 and 7, the bearing surface 16 in the regions 32 reinforced by the gussets 34 bottom out in flush engagement against the workpiece 46. This is best illustrated in FIG. 5 of the drawing wherein the rigid regions 32 are firmly engaged with the workpiece 46, the resilient regions 30 are deflected or bowed upwardly away from the workpiece 46, and the crests 24 of the teeth 22 are firmly held in contact with the workpiece 46.

After the joint has been tightened, the clamp load applied by the fastener 10 is shared by the rigid regions 32 and by the teeth 22 in cooperation with the resilient regions 30. Thus, a certain part of the clamp load is applied directly by the rigid regions 32 and the remainder of the total clamp load is applied by engagement of the teeth 22 against the workpiece 46.

It is typical of threaded joints including toothed fasteners that the teeth further embed into the workpiece over a period of time. An advantage of the fastener 10 of the present invention is that such further tooth embedment does not decrease the clamp load of the joint. As the teeth 22 become further embedded in the workpiece 46, the portion of the clamp load applied by the teeth 22 decreases as the extent of deflection of the resilient flange regions 30 becomes less. However, the total clamp load remains substantially the same and a portion of the total clamp load applied by the rigid regions 32 increases an equivalent amount.

Since the total clamp load is not significantly decreased by embedment of the teeth 22 in the workpiece 46, the fastener 10 does not exhibit a tendency to become loose due to vibrations, cyclic loading or the like. Moreover, the initial clamp load or preload remains greater than the actual loads to which the joint 40 is subject so that fatigue to the fasteners in the joint is avoided.

An extremely important advantage of the fastener 10 is realized when the threaded joint is loosened by rotation of the fastener 10 in the release direction. In the initial increment of loosening rotation of the fastener 10, the locking teeth 22 are continuously and resiliently biased toward the workpiece by the spring-like characteristic of the resilient flange regions 30. Thus, the locking teeth 22 are capable of performing an anti-rotation locking function equivalent to that achieved with known locking fasteners in joints characterized by long bolt lengths and substantial bolt elongation. Even with short bolt lengths and workpiece materials not substantially softer than the teeth 22, the crests 24 and steep surfaces 28 are urged toward the workpiece 46 to dig or bite against the workpiece to achieve substantial off torque throughout the initial loosening rotation of the fastener 10.

In the illustrated embodiment of the invention, there are provided three individual locking teeth 22 in association with each resilient flange region 30. More or fewer teeth might be provided depending upon factors including, among others, the size of the fastener, the intended use of the fastener, the hardness of the material of the workpiece, and the like. It is preferred that where a number of teeth are associated with each resilient region 30 as in the illustrated arrangement, the teeth have relative heights such as to encourage even distribution of the axial tooth loading forces among the various teeth.

In the illustrated arrangement, the three teeth 22 of each grouping are of the same overall shape, but the tooth height (i.e., the axial distance from the bearing surface 16 to the tooth crest 24 in the nontightened condition) of the center tooth is slightly larger than the tooth height of the two flanking outer teeth. Consequently, when the resilient flange region 30 is flexed or bowed upon tightening of the fastener 10 against workpiece 46 as seen in broken lines in FIG. 6, the crests 24 of the three teeth 22 becomes substantially coplanar against the workpiece 46.

In addition, in the preferred embodiment of the invention, each tooth 22 has a nonuniform height to the end that the tooth crest 24 becomes flush with the workpiece 46 upon tightening of the fastener 10. As illustrated in FIG. 7, in the nontightened condition of the fastener the tooth height is greatest at the periphery of the flange 14 and decreases to a minimum at the radially inner end of the tooth. When the fastener 10 is tightened as indicated in broken lines in FIG. 7, the deflection of the flexible flange segment 30 is accompanied by tilting or cocking of the tooth 22 bringing its crest 24 into substantial alignment with the surface of the workpiece.

The principles of the present invention are applicable to fasteners other than the illustrated nut 10, such as flange head bolts and screws. Thus the term "body" as used herein is intended to encompass not only the body of a nut, but also equivalent structures such as the head of a shanked fastener. Moreover, various head or nut body configurations including both external and internal wrenching configurations, may be provided with the locking construction of the present invention.

While the invention has been described with reference to details of the illustrated embodiment, such details are not intended to limit the scope of the invention as defined in the appended claims.

What is claimed and desired to be secured by Letters Patent of the United States is:

1. A locking fastener adapted to be tightened against a workpiece in a threaded joint and comprising:
   a solid body portion having a wrenching structure with a plurality of corners;
   a continuous, generally circular flange formed integrally at a workpiece engaging end of said body portion and extending radially outward from said body portion;
   said flange defining an annular, generally planar bearing surface adapted to face the workpiece in the threaded joint;
   a plurality of discrete and spaced apart reinforcements formed integrally with said body portion and flange, each reinforcement extending both radially and axially between said flange and a corner of said wrenching structure for rendering first circumferentially spaced apart workpiece engaging segments of said flange substantially rigid as the fastener is tightened against the workpiece;
   a plurality of second circumferentially spaced apart flange segments interspersed between said first rigid segments, said second flange segments being flexible in the axial direction upon tightening of the fastener against a workpiece; and a plurality of workpiece engaging locking teeth on said bearing surface and disposed only at said second flange segments, at least one locking tooth projecting axially from each second flange segment, each tooth having a crest comprising a line defined at the junction of opposite tooth sides, said line having a substantial component in the radial direction.

2. A fastener as claimed in claim 1, said reinforcements comprising gussets extending radially outwardly and sloping axially between said corners and said flange.

3. A fastener as claimed in claim 1 wherein a plurality of said locking teeth are located at each second flange segment.

4. A fastener as claimed in claim 1 wherein each tooth crest varies in height and has a maximum height at its radially outer end and a minimum height at its radially inner end.

* * * * *